United States Patent
Argo

(10) Patent No.: US 11,774,265 B2
(45) Date of Patent: *Oct. 3, 2023

(54) SYSTEM AND METHOD OF PUBLISHING MAP DATA TO AN END USER BASED ON LOCATION DATA

(71) Applicant: Timothy Edwin Argo, Roswell, NM (US)

(72) Inventor: Timothy Edwin Argo, Roswell, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,325

(22) Filed: Jun. 10, 2022

(65) Prior Publication Data

US 2022/0316918 A1 Oct. 6, 2022

Related U.S. Application Data

(63) Continuation-in-part of application No. 16/454,227, filed on Jun. 27, 2019, now Pat. No. 11,375,335.

(60) Provisional application No. 62/838,402, filed on Apr. 25, 2019.

(51) Int. Cl.
| | |
|---|---|
| *G01C 21/26* | (2006.01) |
| *G01C 21/32* | (2006.01) |
| *G01C 21/30* | (2006.01) |
| *G06F 21/36* | (2013.01) |
| *G01C 21/00* | (2006.01) |
| *G01C 21/36* | (2006.01) |
| *G01C 21/34* | (2006.01) |

(52) U.S. Cl.
CPC ..... *G01C 21/3889* (2020.08); *G01C 21/3407* (2013.01); *G01C 21/367* (2013.01); *G01C 21/3807* (2020.08)

(58) Field of Classification Search
CPC ............ G01C 21/3889; G01C 21/3807; G01C 21/3407; G01C 21/367
USPC .......................................................... 707/722
See application file for complete search history.

(56) References Cited

U.S. PATENT DOCUMENTS

| | | | |
|---|---|---|---|
| 8,942,920 B1 * | 1/2015 | Davidson ................ G06F 16/23 705/333 |
| 10,061,474 B2 * | 8/2018 | Bertoldo ................ G06F 3/0482 |
| 11,375,335 B2 * | 6/2022 | Argo ....................... G06F 16/29 |
| 2013/0103307 A1 * | 4/2013 | Sartipi ............... G06Q 30/0261 701/465 |
| 2013/0141463 A1 * | 6/2013 | Barnett ................ G09B 29/007 345/636 |
| 2015/0241223 A1 * | 8/2015 | Davidson ........... G01C 21/3837 701/532 |
| 2017/0370733 A1 * | 12/2017 | Garrett ............... G01C 21/3407 |
| 2018/0121957 A1 * | 5/2018 | Cornwall ........... G06Q 30/0261 |

(Continued)

*Primary Examiner* — Jude Jean Gilles
(74) *Attorney, Agent, or Firm* — Dunlap Bennett & Ludwig, PLLC

(57) ABSTRACT

A system and method for publishing map data to an end user at a specified location includes a computing device. The computing device displays a map portion of an area on a digital display. The computing device receives at least one selection by a primary user for a portion of the area represented by the map, creating at least one geofence, and the computing device may attach digital media to the at least one first geofence by the primary user. The map data is retrievable from a mobile computing device of an end user when the mobile computing device is within a location corresponding to the at least one geofence.

20 Claims, 6 Drawing Sheets

(56) References Cited

U.S. PATENT DOCUMENTS

2018/0189835 A1*   7/2018   DeLuca ............. G06Q 30/0246
2019/0212909 A1*   7/2019   Napier ................ G06F 3/03547
2020/0158519 A1*   5/2020   McGavran ............. H04L 67/55

* cited by examiner

SYSTEM AND METHOD OF PUBLISHING MAP DATA TO AN END USER BASED ON LOCATION DATA

CROSS-REFERENCE TO RELATED APPLICATION

This application claims the benefit of priority of (a) U.S. provisional application No. 62/838,402, filed Apr. 25, 2019, and (b) non-provisional Ser. No. 16/454,227, filed Jun. 27, 2019, the contents of both are herein incorporated by reference.

BACKGROUND OF THE INVENTION

The present invention relates to document publishing and retrieval and, more particularly, to a system and method of retrieving documents and other digital media based on an end user's location data.

Important documents and digital media may need to be accessed by employees within a workplace. Currently, the documents and digital media have to be sent by e-mail, text, or provided in hard copy. The current methods are cumbersome for the sender and end users may lose or delete the documents. Additionally, current methods require a sender to know when someone is in need of the required documents or other digital media.

As can be seen, there is a need for a system and method of retrieving documents and other digital media based on an end user's location data.

SUMMARY OF THE INVENTION

In one aspect of the present invention, a method of publishing map data to an end user at a specified location, the method including the following: displaying, via software running on a computing device, a map for an area; receiving, via software running on a computing device, at least one selection by a primary user for a portion of the area represented by the map, creating at least one geofence; and attaching, prior to an emergency, via software running on the computing device, pre-planned map data to each geofence by the primary user, wherein the pre-planned map data is retrievable from a mobile computing device of an end user immediately upon the mobile computing device being within a location corresponding to the geofence attached to said pre-planned map data, wherein receiving a selection comprises receiving a series of point selections on the map from the primary user and determining a polygon having vertices corresponding to the point selections, wherein the mobile computing device is verified by the end user logging into an application loaded on a memory of the mobile computing device, wherein a global positioning system of the mobile computing device determines if the mobile computing device is within the at least one geofence, wherein the at least one selection is a plurality of selections creating a plurality of geofences, wherein the end user attaches different pre-planned map data to each of the plurality of geofences; wherein the pre-planned map data includes a pre-planned escape route map display, wherein the pre-planned escape route map display comprises an interactive map presenting an end user location indicator at the retrieved location of the mobile computing device, wherein the interactive map provides a representation of a route to a safe zone specified for the area, wherein the area is at least one of the following: a building, a structure, and a place of assembly, wherein the interactive map communicates with a fire alarm system of the area for determining an updated escape route for each user via the mobile application, and wherein the interactive map communicates with an emergency personnel application loaded on a client computing device, wherein the client computing device is configured to monitor the interactive map and its end user location indicator; wherein the pre-planned map data comprises one or more pre-planned alerts, wherein each pre-planned alert is determined by the primary user via the computing device, wherein each pre-planned alert comprises at least one of the following: a pre-planned push notification, a pre-planned text message, and a pre-planned telephone call; and/or, wherein the pre-planned map data comprises at least one of the following a pre-planned digital image, a pre-planned digital photo, a pre-planned location guideline, and a pre-recorded video.

In another aspect of the present invention, a system for publishing map data to an end user at a specified location, the system including the following: at least one processor; at least one memory; at least one communication interface for communicating over a network; and a plurality of program instructions stored in the at least one memory that, when executed by the at least one processor, cause the at least one processor to: display a map for an area; receive at least one selection by a primary user for a portion of the area represented by the map, creating at least one geofence; and attaching prior to an emergency pre-planned map data for each geofence by the primary user, wherein each pre-planned map data is retrievable from a mobile computing device of an end user immediately upon the mobile computing device being within a location corresponding to the at least one geofence.

In another aspect of the present invention, a method for publishing map data to an end user at a specified location comprising steps of: displaying, via software running on a computing device, a map for an area; receiving, via software running on a computing device, at least one selection by a primary user for a portion of the area represented by the map, creating at least one geofence; and attaching, prior to a mobile computing device of an end user entering the area, via software running on the computing device, pre-planned map data to each geofence by the primary user, wherein each pre-planned map data is retrievable from said mobile computing device immediately upon the mobile computing device being within a location corresponding to the at least one geofence.

These and other features, aspects and advantages of the present invention will become better understood with reference to the following drawings, description, and claims.

DETAILED DESCRIPTION OF THE INVENTION

Figure 1:
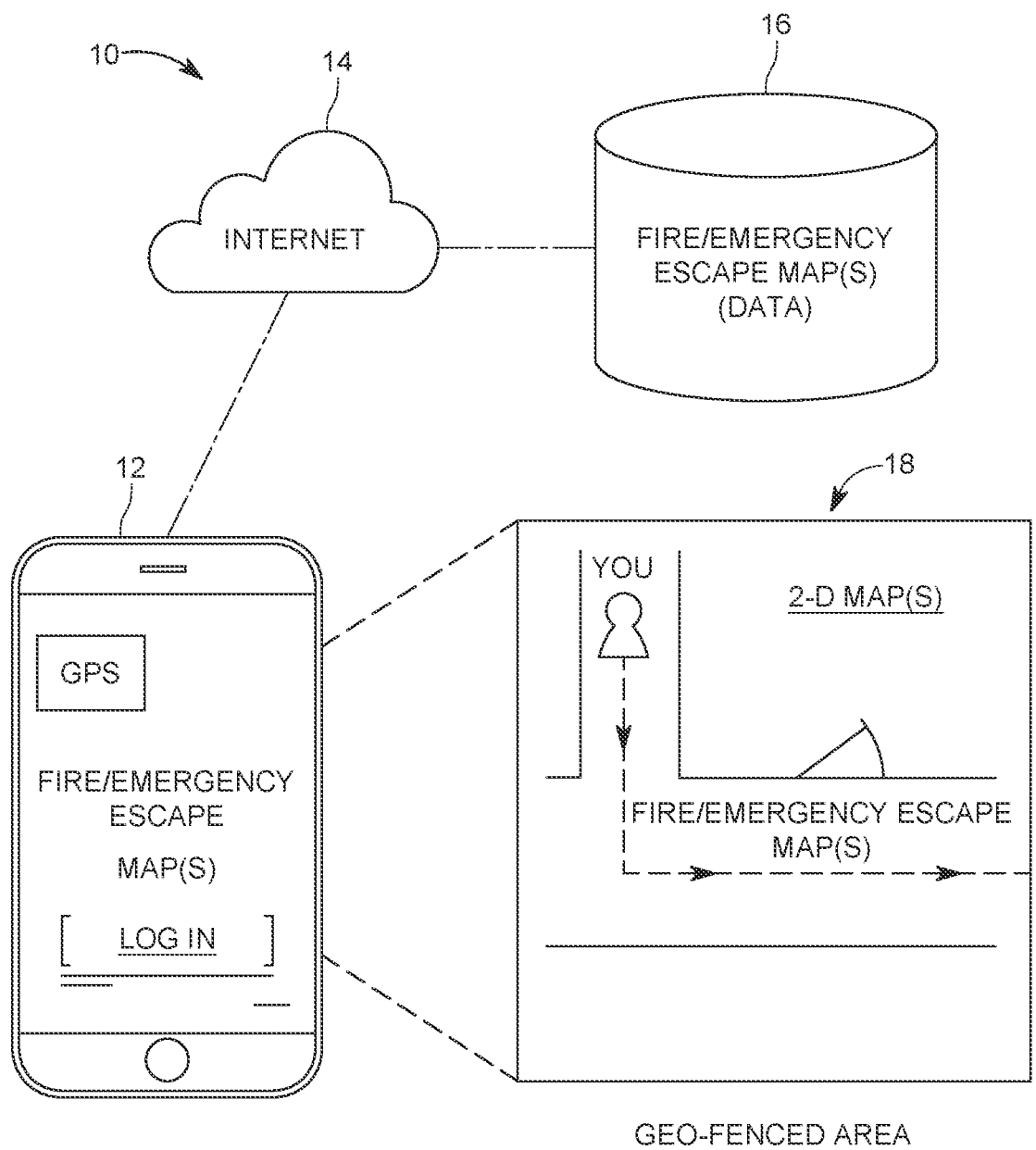
FIG. 1 is a schematic view of an embodiment of the present invention.
Figure 2:
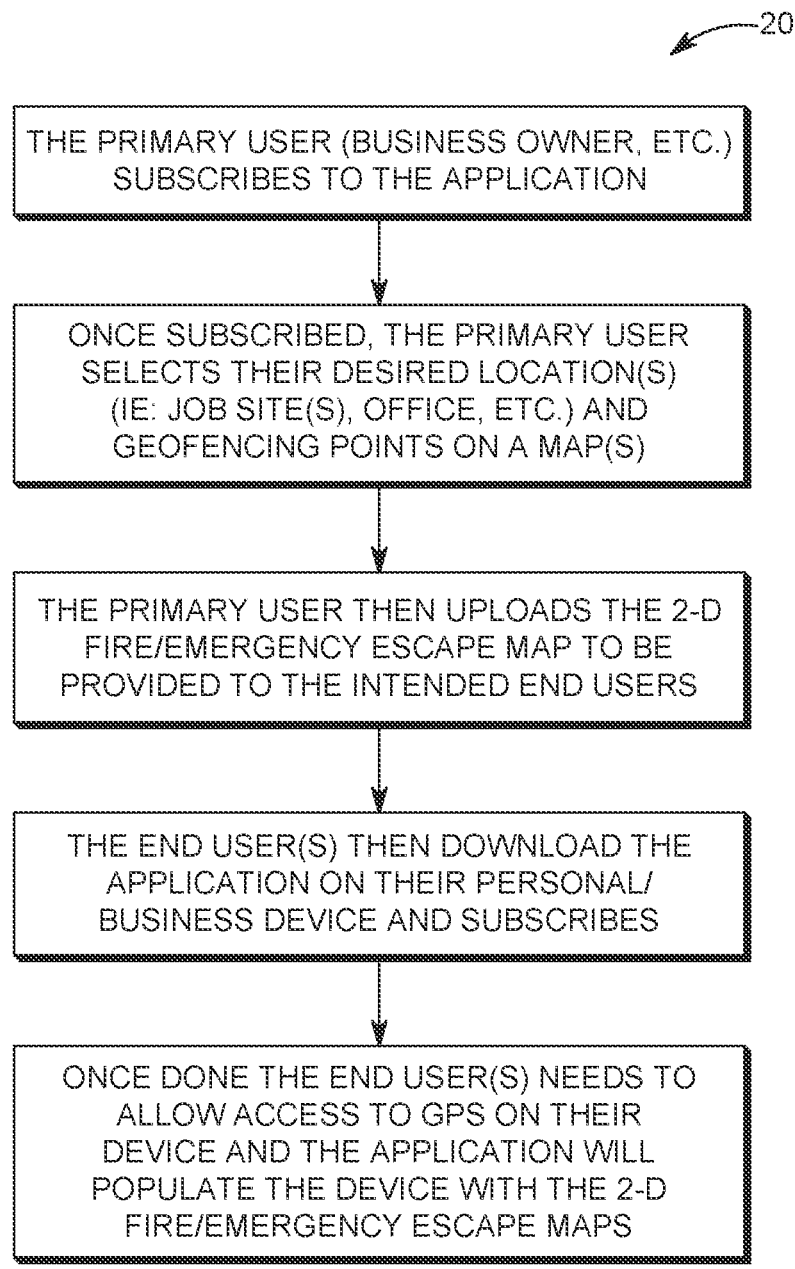
FIG. 2 is a flowchart of an embodiment of a method of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

The present invention includes a system of geofencing that provides emergency action plan documents and other digital media to a receiver based on GPS or cellular triangulation. The present invention provides on demand information by location to anyone in the pre-selected geofenced area.

Referring to FIGS. 1 through 6, the present invention includes a system and method 10 for publishing digital media to an end user at a specified location. The system and method 10 may be performed on a computing device 12 including at least one processor, at least one memory, at least one communication interface for communicating over a network 14, and a plurality of program instructions stored in the at least one memory that, when executed by the at least one processor, cause the at least one processor to perform steps. The computing device 12 may display a map portion of a geographic region on a digital display. The computing device may further receive at least one selection by a primary user for a portion of the geographic region represented by the map, creating at least one geofence, and the computing device 12 may attach digital media 16 to the at least one first geofence by the primary user. The digital media 16 is retrievable from a mobile computing device 12 of an end user when the mobile computing device 12 is within a geographic location corresponding to the at least one geofence.

The computing devices 12 may include, but are not limited to, laptops, desktops, or smart devices, such as smart phones and tablets. Each of the computing devices 12 include at least the processor and the memory. The computing devices 12 may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing devices 12 include a processor, memory, a user interface, and a communication interface. In particular embodiments, the processor includes hardware for executing instructions, such as those making up the software program. The memory includes main memory for storing instructions such as software program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to the computing devices 12, where appropriate. In particular embodiments, the memory is non-volatile, solid-state memory.

The user interface includes hardware, software, or both providing one or more interfaces for user communication with the computing devices 12. As an example, and not by way of limitation, the user interface may include a keyboard, keypad, microphone, monitor, mouse, printer, scanner, speaker, still camera, stylus, tablet, touchscreen, trackball, video camera, another user interface, or a combination of two or more of these.

The communication interface includes hardware, software, or both providing one or more interfaces for communication (e.g., packet-based communication) between the computing devices 12 on one or more networks. As an example, and not by way of limitation, the computing devices 12 may include a communication interface including a network interface card (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing devices 12 may communicate via an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing devices 12 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing devices 12 may include any suitable communication interface for any of these networks, where appropriate. As mentioned above, the primary user may select a series of points to create the geofence. The present invention includes a selection system for specifying a geolocation. Particularly, the primary user can locate a desired location in a browser using, for example, a map application such as Google Maps®. The user can then click a variety of points to define a polygon (or expand a rectangle, circle, etc.).

The user can identify a region of interest by zooming into a region of the map (for example, by scrolling a mouse wheel) or selecting icons. The user can also enter an address in a box, and the map may automatically center and/or zoom to that address. By selecting a generate geolocation icon, the system allows the user to create the geofence. The user can indicate a plurality of points to define the boundaries of the geofence. The geofence may be made as a polygon, circles, rectangles, and other predefined shapes can also be used for order specification.

For example, the primary user can select a first point on the map. Following the first point selection, the system can depict, via a dotted line or other indicator, the resulting edge that would be created were the user to again select another position on the map. The primary user selects a second position. The primary user again moves the cursor to another point and a dotted line indicates the potentially resultant edge. A third point is selected. The system can then fill in the resulting triangular region to provide the primary user with an indication of the area within the geofence. The user can continue to create additional polygonal points, or the user can select the initially generated point to complete the geofence. A confirmatory popup can be presented allowing the primary user to name the geofence for future reference, or to delete the geofence. In certain embodiments, the at least one selection is a plurality of selections creating a plurality of geofences. The primary user may attach different map to each of the plurality of geofences.

As mentioned above, the primary user can attach map data retrievable stored in a database 16 to the specified geofencing. In such embodiments, the database 16 may be stored on the computing device or a remote server, such as a cloud-based server. The computing system 12 may allow the primary user to log into an account of the present invention using credentials. The primary user may then create the geofence as described above, and then drag and drop the map data retrievable stored in a database 16 into the geofence. The linked geofence and database 16 is then saved to a remote server, which may be disseminated over the internet 14 to those end users that enter the geographic location corresponding to the geofence.

The end user of the present invention may be verified by logging into an account of the present invention using credentials. In certain embodiments, the present invention may include an application loaded on a memory of the mobile computing device 12. The end user may open the application and log into the application. When the end user enters the geographic location, the application may use the global positioning system of the mobile computing device 12 or may calculate the location of the mobile computing device 12 using cellular towers. Once the application verifies that the user is within the geographic location, the end user may access the database 16.

A person uses the present invention to get on demand specific information that may be required for emergency and non-emergency situations simply based on their physical location. The present invention may further provide time keeping data, end users exact location, video/audio recording of emergency situations of end user, automatic emergency help requests and data pushes to unlimited numbers of users. The present invention could be used to send information based on the user's physical location and can be used to receive information based on the user's physical location.

The present invention may include pre-planned escape route map(s) that become an interactive map created by two-dimensional (2D) or three-dimensional (3D) data collected and incorporated into the software that shows the location of the end-user on the interactive map. The software, via the interactive map, guides the user out of the building, structure, and/or location to a designated assembly or safe zone specified for that particular building, structure, and/or location.

The interactive map may communicate with a buildings' fire alarm system via a communication link from the fire alarm system's hardware devices and software and/or from the fire alarm system provider. This communication link can relay the area of the smoke, heat, and/or fire detected location within a building, structure, or location and relay that information to the present software to be incorporated into the predetermined interactive map. Using this communication, the software can determine the specific escape route for each user on the predetermined building, structure, or location map(s) via the mobile application. The user is guided to one of several predetermined assembly or safe zones. Local Area Networks (LAN) may be incorporated to provide primary or secondary communication for the software to communicate to the user mobile devices and the software stored data.

A two-dimensional interactive map rendering of the building, structure, or location uploaded to a computing device, wherein the systemic software is configured to render or display a map of the location, structure, and/or building is created. This rendered escape map is then placed at the location using geofencing technology.

The location of all users within the two-dimensional (2D) or three-dimensional (3D) rendered map can be monitored live via the software allowing communication to emergency personnel of people's specific location within the location, structure, and or building and people's arrival to the pre-designated assembly or safe zone. This information assists emergency personnel in determining appropriate response and rescue of people.

Figure 5:
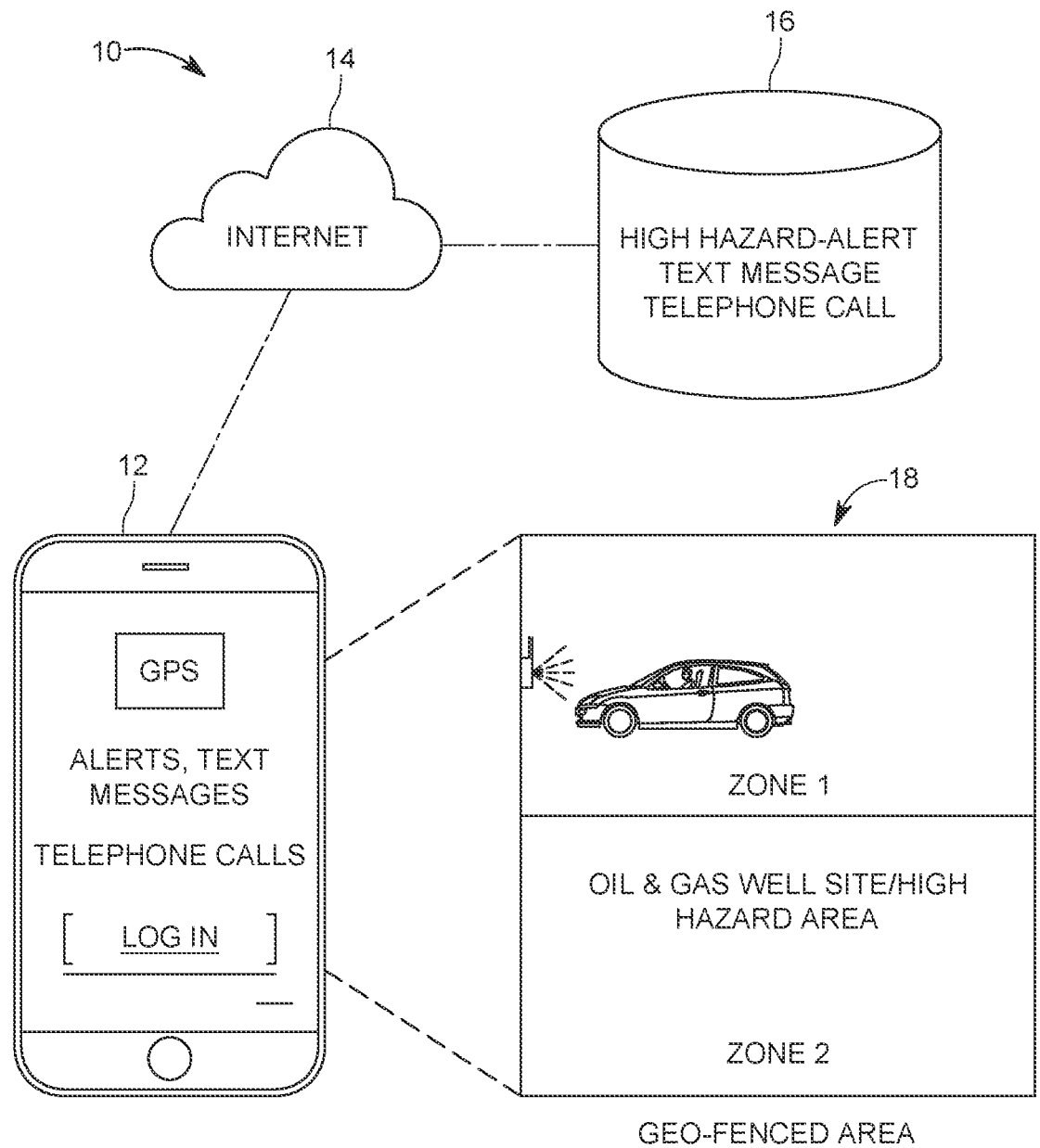
FIG. 5 is a schematic view of an embodiment of the present invention.
Figure 6:
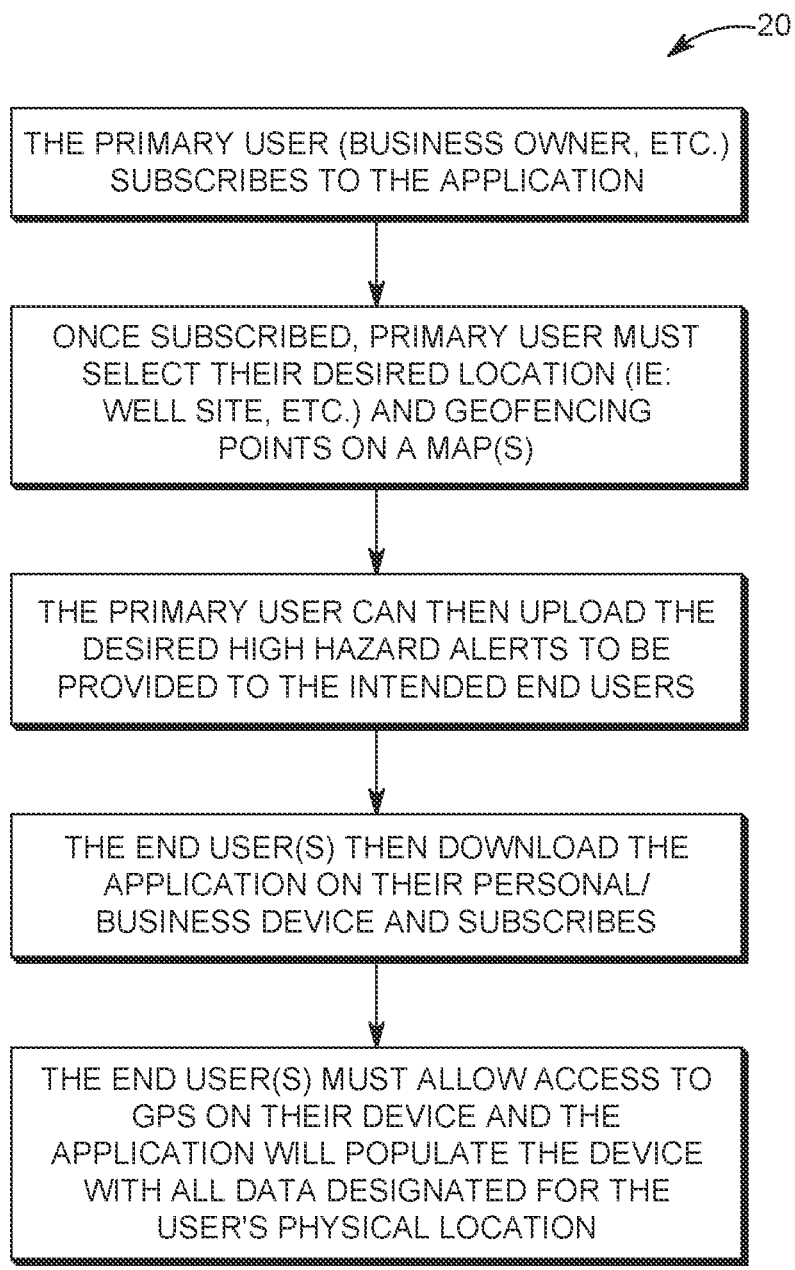
FIG. 6 is a flowchart of an embodiment of a method of the present invention.

The present invention may be configured so that pre-planned alerts can be sent to users once they enter a geofenced area. These alerts are determined by the administrator and can be established in high hazard/high danger areas to alert users entering these areas of the known dangers associated with the specific location. Alerts can be by push notification, text messaging, telephone calls, or a combination of all. Example: Oil and Gas worker enters a high hazard/high danger well site with H2S gas. Once the worker crosses the nearest geofenced barrier, the worker will receive one or more alerts notifying the worker he is entering a high hazard/high danger H2S zone and is directed to follow established protocols before continuing into the area, as illustrated in FIGS. 5 and 6.

The present invention may be configured so that pre-planned digital images/photos, location guidelines, and pre-recorded videos can be published within a geofenced area providing informative content specific to the geofenced location(s).

Thereby the present invention provides map data including alerts, interactive escape routes, and other information to occupants in the building during emergency situations and non-emergency situations. The map data may include indications of the locations of the occupants within an indoor or outdoor map of the building, a representation of a route to a safe exit from the building, a representation of a recommended entrance to the building for an emergency responder to enter, etc.

The map data may also include outdoor map data including a 2D or 3D model of the exterior of the building, and a layout of the building premises. Additionally, the information may include indoor map data including floor layouts of one or several floors of the building with indications of the different areas of the building, such as classrooms, hallways, assembly space etc., and indications of the entrances and/or exits to and/or from the building.

The cloud-based server 14 may generate the indoor and outdoor map views based on map data from a map database. The cloud-based server 14 may generate a 2D or 3D model based on map data from the user's current location from a map database 16 to generate map data for display 18 on the mobile computing device 12. The cloud-based server 14 may receive map data and provides the map data to the mobile computing device 12 which then renders the map display 18 based on the map data. For example, the indoor map data may include location information for the location of an occupant, and the mobile computing device 12 may present an occupant location indicator 22 at the retrieved/published location.

Figure 3:
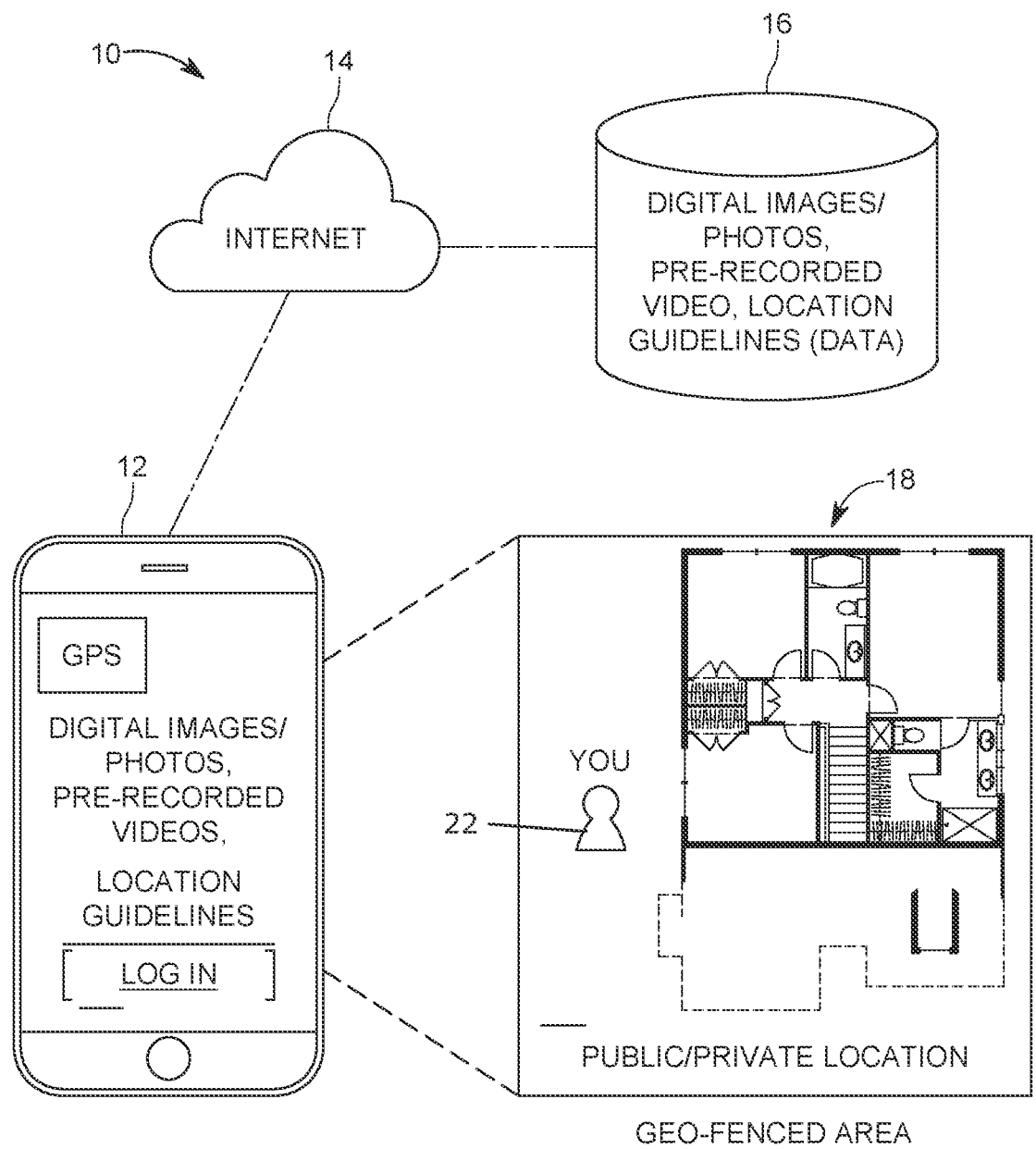
FIG. 3 is a schematic view of an embodiment of the present invention.
Figure 4:
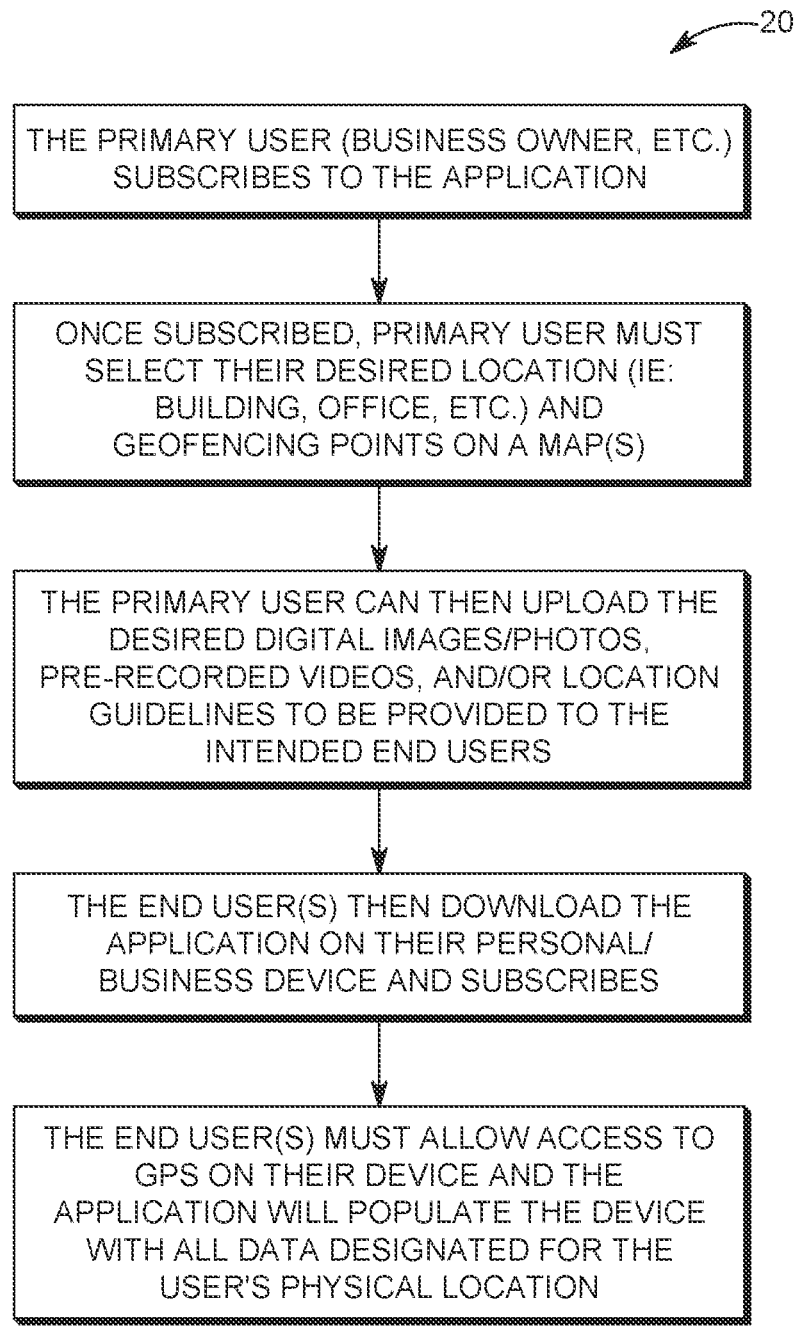
FIG. 4 is a flowchart of an embodiment of a method of the present invention.

The map data may include a floor layout indicating each area of the floor, such as rooms, hallways, places of assembly, etc. For buildings with multiple floors, the indoor map data may include several floor layouts with a user control for selecting one of the floors to display or may include several floor layouts presented in the same display. The map data may also indicate each of the exits from the building or stairwells and exits from each of the rooms, as illustrated in FIG. 3, wherein the map display may include indications 22 of the precise locations of each occupant within a particular zone. The map data information may also include outdoor map data including a 2D or 3D model of the exterior of the building, and a layout of an area premises.

The present invention may include an emergency personnel application that presents similar information but is associated with emergency personnel. Accordingly, emergency personnel may get an alert notifying the emergency personnel that a dangerous situation has been detected, and the map data including floor layouts, an indication of the location of the safety zone, and indications of the number of occupants in each area of the building and precise locations of each occupant within a particular area. In this manner, the emergency responder may be made aware of the occupants that need immediate assistance.

The emergency responder application may be executed on the client computing devices 12 of emergency personnel, such as police officers, fire fighters, paramedics, etc. In another example, the emergency responder application may execute on a client computing device 12 of a police dispatcher, such as a mobile smart device, laptop or desktop computer, and the police dispatcher may provide the information from the emergency responder application to police officers assigned to the area.

It should be understood, of course, that the foregoing relates to exemplary embodiments of the invention and that modifications may be made without departing from the spirit and scope of the invention as set forth in the following claims.

What is claimed is:

1. A method for publishing map data to an end user at a specified location, the method comprising:
    displaying, via software running on a computing device, a map for an area;
    receiving, via software running on a computing device, at least one selection by a primary user for a portion of the area represented by the map, creating at least one geofence; and
    attaching, prior to an emergency, via software running on the computing device, pre-planned map data to each geofence by the primary user, wherein
    the pre-planned map data is retrievable from a mobile computing device of an end user immediately upon the mobile computing device being within a location corresponding to the geofence attached to said pre-planned map data.

2. The method of claim 1, wherein receiving a selection comprises receiving a series of point selections on the map from the primary user and determining a polygon having vertices corresponding to the point selections.

3. The method of claim 1, wherein the mobile computing device is verified by the end user logging into an application loaded on a memory of the mobile computing device.

4. The method of claim 1, wherein a global positioning system of the mobile computing device determines if the mobile computing device is within the at least one geofence.

5. The method of claim 1, wherein the at least one selection is a plurality of selections creating a plurality of geofences, wherein the end user attaches different pre-planned map data to each of the plurality of geofences.

6. The method of claim 1, wherein the pre-planned map data comprises a pre-planned escape route map display.

7. The method of claim 6, wherein the pre-planned escape route map display comprises an interactive map presenting an end user location indicator at the retrieved location of the mobile computing device.

8. The method of claim 7, wherein the interactive map provides a representation of a route to a safe zone specified for the area.

9. The method of claim 7, wherein the area is at least one of the following: a building, a structure, and a place of assembly.

10. The method of claim 8, wherein the interactive map communicates with a fire alarm system of the area for determining an updated escape route for each user via the mobile application.

11. The method of claim 8, wherein the interactive map communicates with an emergency personnel application loaded on a client computing device, wherein the client computing device is configured to monitor the interactive map and its end user location indicator.

12. The method of claim 1, wherein the pre-planned map data comprises one or more pre-planned alerts.

13. The method of claim 12, wherein each pre-planned alert is determined by the primary user via the computing device.

14. The method of claim 13, wherein each pre-planned alert comprises at least one of the following: a pre-planned push notification, a pre-planned text message, and a pre-planned telephone call.

15. The method of claim 1, wherein the pre-planned map data comprises at least one of the following a pre-planned digital image, a pre-planned digital photo, a pre-planned location guideline, and a pre-recorded video.

16. A system for publishing map data to an end user at a specified location, comprising:
    at least one processor;
    at least one memory;
    at least one communication interface for communicating over a network; and
    a plurality of program instructions stored in the at least one memory that, when executed by the at least one processor, cause the at least one processor to:
        display a map for an area;
        receive at least one selection by a primary user for a portion of the area represented by the map, creating at least one geofence; and
        attaching prior to an emergency pre-planned map data for each geofence by the primary user, wherein
        each pre-planned map data is retrievable from a mobile computing device of an end user immediately upon the mobile computing device being within a location corresponding to the at least one geofence.

17. The system of claim 16, wherein the pre-planned map data comprises a pre-planned escape route map display having an interactive map presenting an end user location indicator at the retrieved location of the mobile computing device, wherein the interactive map provides a representation of a route to a safe zone specified for the area.

18. The system of claim 16, wherein the pre-planned map data comprises one or more pre-planned alerts, wherein each pre-planned alert is determined by the primary user via the computing device, and wherein each pre-planned alert comprises at least one of the following: a push notification, a text message, and a telephone call.

19. The system of claim 16, wherein the pre-planned map data comprises at least one of the following a pre-planned digital image, a pre-planned digital photo, a pre-planned location guideline, and a pre-recorded video.

20. A method for publishing map data to an end user at a specified location comprising steps of:
    displaying, via software running on a computing device, a map for an area;
    receiving, via software running on a computing device, at least one selection by a primary user for a portion of the area represented by the map, creating at least one geofence; and
    attaching, prior to a mobile computing device of an end user entering the area, via software running on the computing device, pre-planned map data to each geofence by the primary user, wherein each pre-planned map data is retrievable from said mobile computing device immediately upon the mobile computing device being within a location corresponding to the at least one geofence.

\* \* \* \* \*